United States Patent [19]
Marsh et al.

[11] 3,781,114
[45] Dec. 25, 1973

[54] POSITION INDICATING SYSTEM FOR INDICATING THE ANGULAR POSITION OF A CONTINUOUSLY ROTATING MEMBER UTILIZING COUNTER MEANS

[75] Inventors: Robert W. Marsh; Alden J. Mooers, both of Minneapolis, Minn.

[73] Assignee: Control Data Corporation, Minneapolis, Minn.

[22] Filed: June 18, 1969

[21] Appl. No.: 834,421

[52] U.S. Cl. ........................... 356/152, 250/231 SE
[51] Int. Cl. ............................................. G01b 11/26
[58] Field of Search ..................... 250/233, 231 SE, 250/232; 356/152, 141; 178/21; 318/603, 685, 138

[56] References Cited
UNITED STATES PATENTS
2,927,735  3/1960  Scuitto........................... 318/603
3,370,289  2/1968  Hedgecock ...................... 318/603

FOREIGN PATENTS OR APPLICATIONS
1,259,951  3/1961  France ............................. 356/152

Primary Examiner—Carl D. Quarforth
Assistant Examiner—J. M. Potenza
Attorney—Cushman, Darby and Cushman

[57] ABSTRACT

A position indicating system and more specifically an angular position indicating system for accurately indicating the angular position of a continuously rotating member wherein a stepping motor is continuously rotated to drive a reticle or other movable member and wherein a counter provides an accurate interpolation of the position of the member and of the motor between the step positions of the motor and wherein the ratio of the instantaneous count of the counter to the total count of the counter is equal to the ratio of the angular position of the stepping motor to 360°.

11 Claims, 4 Drawing Figures

POSITION INDICATING SYSTEM FOR INDICATING THE ANGULAR POSITION OF A CONTINUOUSLY ROTATING MEMBER UTILIZING COUNTER MEANS

The present invention relates to a position indicating system and more particularly to an angular position indicating system wherein a stepping motor is used to rotate a reticle or other movable member and wherein a counter is utilized to accurately indicate the angular position of the stepping motor and to accurately interpolate the position of the motor between the various step positions thereof.

One of the most critical problems confronting man as he has pressed outwardly from wordly confinement into the area of space travel has been one of accurately determining his position in space. Scanning to detect the relative positions of three or more stars within the field of view has proven to be a very effective means of determining the attitude or pointing direction of the scanning system and the space vehicle on which the scanning system is mounted. The present invention provides a position indicating system or an angular position indicating system for accurately determining the positions of stars so as to enable the space vehicle to accurately determine its position in space. Although the present invention is peculiarly adaptable for use in this type of an environment it should also be understood that this invention has wide applications and may readily be adapted for use in numerous types of position indicating systems.

The general purpose of this invention is to provide an angular position indicating system which embraces all of the advantages of similarly employed systems and possesses none of the disadvantages thereof. To attain this the present invention contemplates a unique arrangement of a stepping motor in conjunction with a stable oscillator and a counter whereby the ratio of the instantaneous count of the counter to the total count of the counter is equal to the ratio of the angular position of the stepping motor to 360° so that the position of the stepping motor can be accurately interpolated between the various steps thereof.

An object of the present invention is the provision of a position indicating system for accurately determining the position of a movable member.

Another object is to provide an angular position indicating system for accurately determining the position of a continuously rotating reticle.

A further object of the invention is the provision of an angular position indicating system wherein a plurality of interpolation points are provided between each step of a stepping motor so as to accurately determine the position of the motor.

Other objects and features of the invention will become apparent to those of ordinary skill in the art as the disclosure is made in the following description of a preferred embodiment of the invention as illustrated in the accompanying sheets of drawings, in which.

Figure 1:
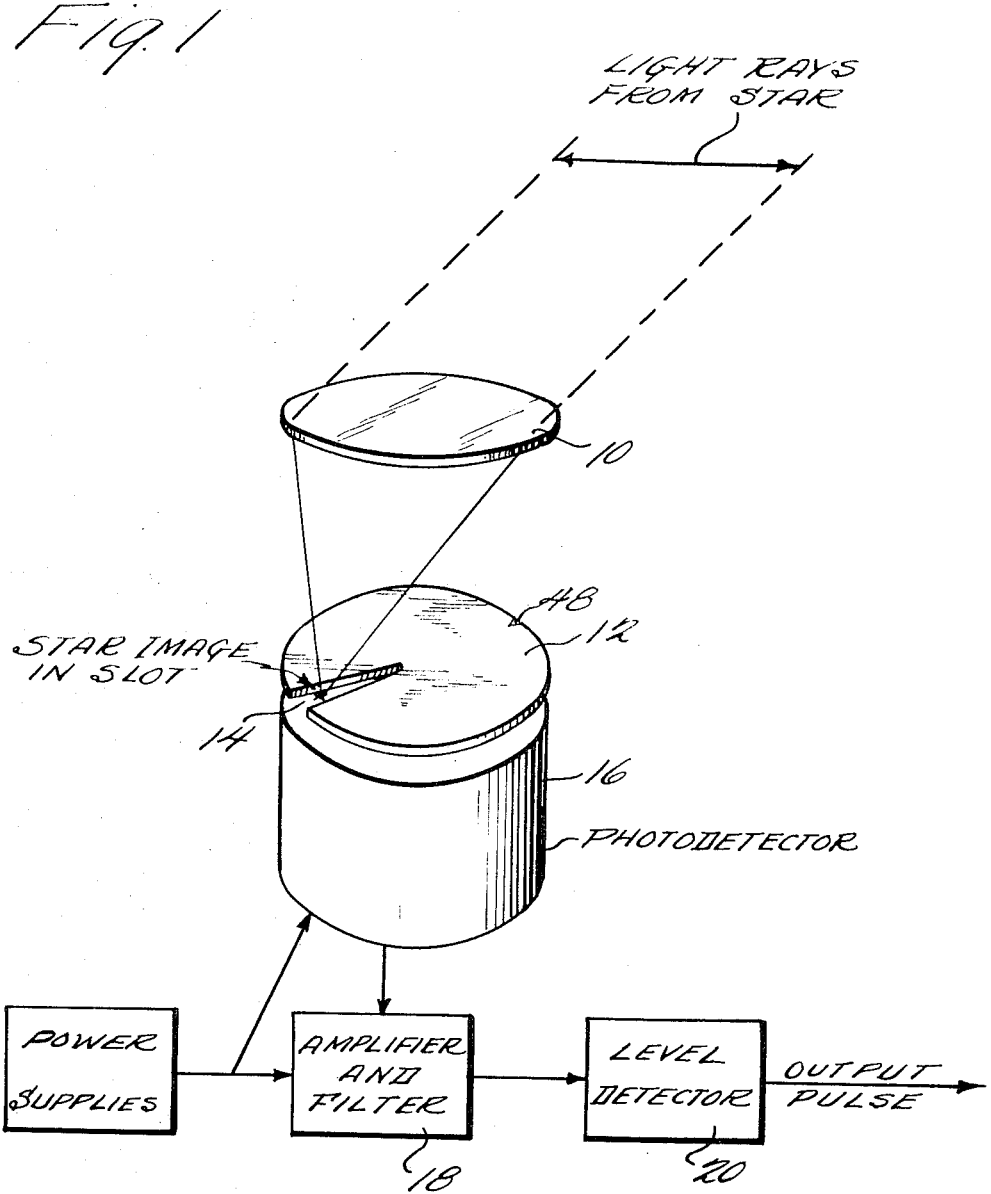
FIG. 1 shows, partly in perspective and partly in block diagram form, one embodiment of the invention.

With reference now to the drawings, wherein like reference characters designate like or corresponding parts throughout the several views, there is shown in FIG. 1 an illustration of a scanning celestial sensor. Light from the stars sought to be detected is passed through the lens system 10 which focuses the star images on the plane of the reticle 12 so that as the reticle and the radial slit therein rotate through the star image, the image is detected by the photo detector 16. The reticle azimuth angles at which each star is detected may be used by a computer (not shown) which may be fed by the amplifier and filter 18 and by the level detector 20. The computer may be utilized for star pattern recognition, identification of the individual stars, and for the determination of the pointing direction of the optical axis. To accomplish this, a means must be provided for rotating the reticle and also for determining its exact azimuth at the instant the star image transits the reticle slit. In the past, this has been accomplished by the use of various forms of drive motors and gear trains in conjunction with an angle encoder; however, such prior systems have not provided information with respect to the position of the reticle to the degree of accuracy required. In addition, similar systems have heretofore employed belts, gears, speed reducers, or other items that have significantly reduced the life of the systems so as to make them inappropriate for use in a space environment.

The angular position indicating system of this invention utilizes an electromechanical, digital, synchronous, rotary drive to turn a reticle or other movable member at an extremely uniform rate while simultaneously providing extremely accurate information with respect to the rotary position of the reticle at any instant of time. The system may preferably be designed to operate in the region of 1 to 120 revolutions per minute, or a period of 60 to 0.5 seconds. The armature or rotor assembly is the only moving part of the system in order to provide for long life, and the rotor assembly, for example, may have a total of 256 teeth (not shown) cut into its periphery, and 32 electromagnetic stator poles (not shown) may be located around the rotor assembly.

The stepping motor thus formed, may be described as a magnetic harmonic drive since each stator pole is separately energized in a sequence which must make one circuit of the 32 stator poles in order to advance the rotor assembly by one tooth. Thus, in the representative embodiment herein described, it requires 32 times 256 or 8192 ($2^{13}$) discrete pulses to the stator poles to drive the rotor assembly around one complete revolution.

The rotor pole teeth of this representative embodiment are all equally spaced, but the stator poles are not spaced an integral number of rotor poles apart. Instead, the pulsed poles may be spaced 8 1/32 times the rotor tooth spacing so that each time a pole is pulsed in the proper order, the rotor will rotate 1/32 of the angle between adjacent teeth. In this representative embodiment, the angle between the teeth is 1.40625° so that the rotor moves 2.63672 minutes of arc for each magnetic pulse. The cumulative effect of the non-integral pole spacing may be made up between the last pole and the first pole so that they will be 7 1/32 teeth apart.

Another variation of the adjacent pole pulsing sequence may provide for the successive pulses to alternate back and forth to opposite sides of the rotor assembly. With this design, each pulse rotates the rotor assembly 1/32 of a tooth, but the spacing of adjacent stator poles is 8 1/16 times the rotor tooth spacing. The cumulative effect of this spacing configuration may be accounted for in two places, e.g., between the sixteenth and seventeenth poles and between the thirty-second and first poles which have a spacing equivalent to 7 3/32 and 7 1/32 times the rotor tooth spacing.

The magnetic force of the stator poles and the moment of inertia of the rotor are designed for a ratio so that the rotor will not stop during a pulse, but will coast on toward the next pole. Some slowing down, or cogging, will occur between pulses due to friction and opposing magnetic foces, but minimizing this effect is the primary reason for the large number of poles and it may be further reduced by optimizing the pulse shape and driving voltage in ways that are well known in the art.

Pulses are initiated by a master oscillator and are then fed through an electronic count-down counter, the output of which is fed through a sequencing or drive circuit to pulse the proper pole of the stepping motor. The frequency of the master oscillator and the number of stages of the count-down counter determine the rotating speed of the rotor assembly of the stepping motor, and because the rotor rotates synchronously with the pulses received thereby, the pulses from the master oscillator may be directly used for interpolating the intermediate angles between the teeth for the various stepped positions of the motor to the desired degreee of accuracy. The driving pulses to the motor may be used to determine the exact amount of rotation between steps, and the master oscillator provides counts for the desired degree of interpolation for increased accuracy. In addition, a zero reference signal is provided in the system to establish a zero position of the rotor assembly, and it may also act as a monitor to provide a signal when rotation has stopped or when there has been a malfunction.

One function of the electronic circuitry of this invention is to provide the necessary pulses to the stator of the stepping motor in the proper order to rotate the reticle disc 12. As previously described with respect to a representative embodiment, the stator electromagnets (not shown) may be spaced such that a sequence of 32 pulses, or one per coil, will advance the rotor assembly by one tooth. Since the rotor of this representative embodiment may have 256 teeth, a total of 32 times 256 or 8192 pulses are required to rotate the reticle disc 12 through one complete revolution. In addition, the electronic circuitry of this invention provides the digital angular position of the reticle for the instant the star image transits the reticle slit 14.

Figure 2:
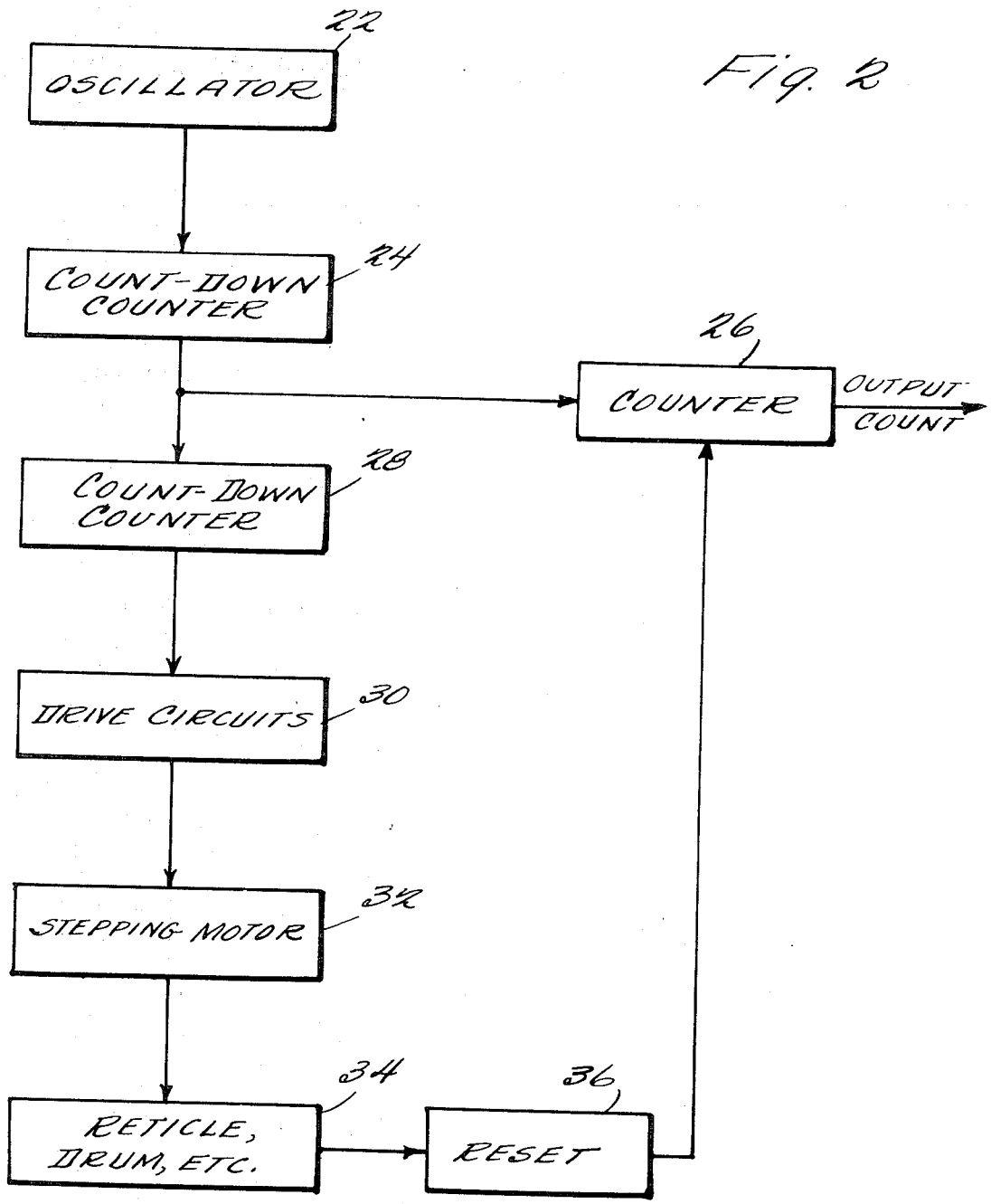
FIG. 2 shows a more detailed block diagram view of the embodiment illustrated in FIG. 1.

The basic operation of the system may be understood by referring to FIG. 2 wherein a stable oscillator 22 is utilized to originate the pulses for the operation of the system. A standard 500 KHz crystal oscillator may be used because of its ready availability and low cost. The output of oscillator 22 is then fed into count-down counter 24 which may be composed of two cascaded four-bit binary counters. The frequency output from the counter 24 may be varied, but for this example the output from the counter is selected to be $2^{18}$ or 262,144 Hz. This output is used as an input to counter 26 and as the input for the additional count-down counter 28, which is fixed to provide a count-down of $2^{-5}$ Hz so that the output therefrom $2^{13}$ or 8192Hz. The output from counter 28 is then fed into the drive circuitary 30 which is used to commutate the train of pulses from the count-down counter 28 to the proper sequence to drive the stepping motor 32 and the associated reticle, drum or other type of movable member 34 in the desired direction. Also associated with the movable member 34 is reset menas 36 which is operatively associated with the counter 26 to reset the counter to a predetermined starting count, e.g., zero, for each revolution of the member 34.

Figure 3:
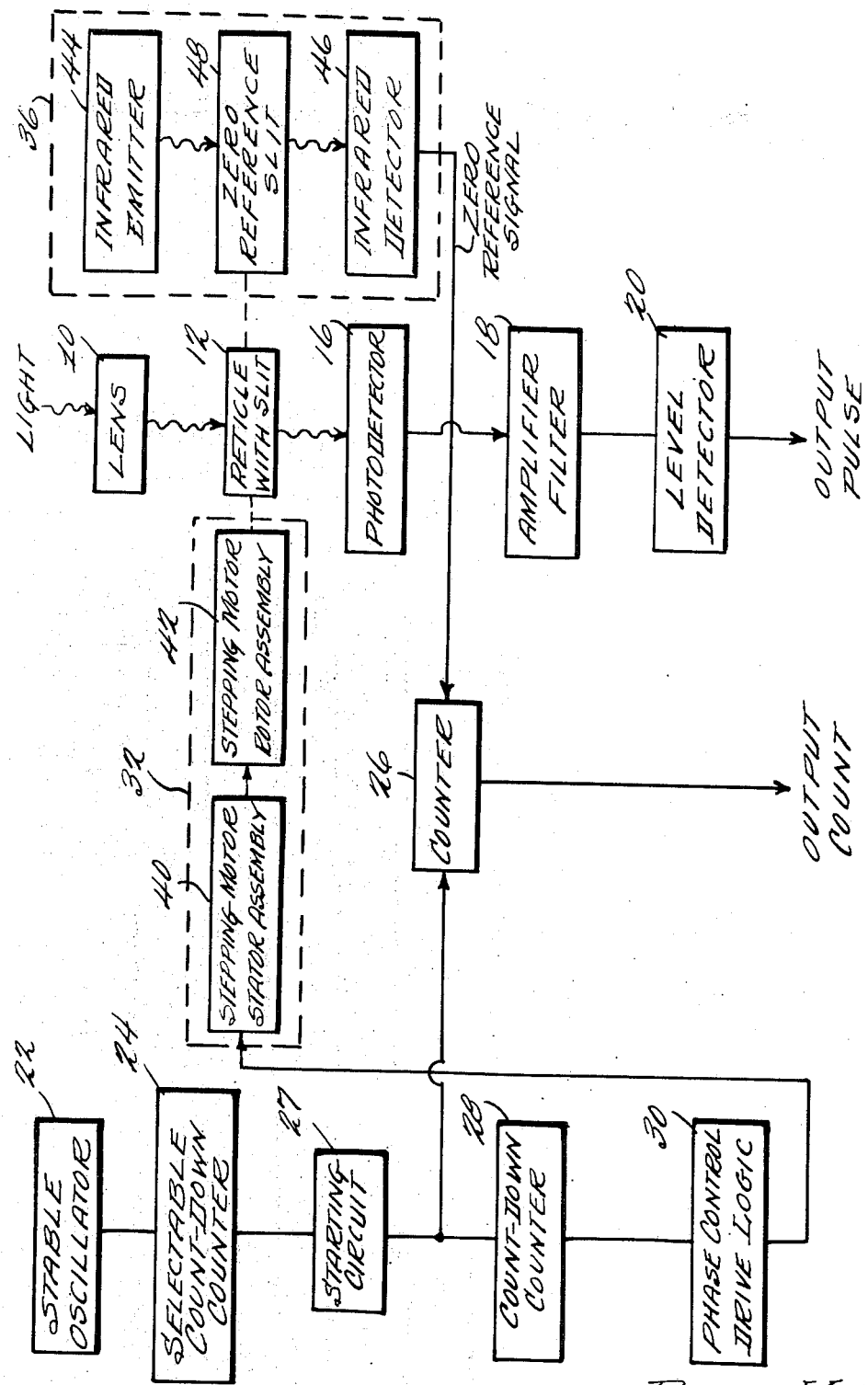
FIG. 3 shows a still more detailed block diagram view of the embodiment of FIG. 1.

FIG. 3 shows a more detailed representation of the angular position indicating system of this invention wherein the system is used to detect the relative positions of stars. As described with respect to FIG. 2, the drive logic or circuitry 30 is used to commutate the train of pulses from the count-down counter 28 to the proper sequence for the 32 stator magnets (not shown) in the stator assembly 40 of the stepping motor 32 so as to drive the rotor 42 and the associated reticle 12 in the desired direction. This sequence is repeated on a modulo 32 basis, and after repeating 256 times a total of 8192 pulses have passed and the rotor 42 has moved on revolution as has the reticle 12. Therefore, for each $2^{18}$ or 262,144 pulses from the counter 24, the stepping motor 32, and more specifically the stator assembly 40 therein, will receive 8192 pulses and the rotor assembly 42 will make one complete revolution. During the time that the motor and the reticle are being driven, the $2^{18}$ pulses from counter 25 are being fed into counter 26 so that the ratio of the instantaneous count of the counter 26 to the total count of that counter is equal to the ratio of the angular position of the rotor assembly 42 and the reticle 12 to 360°. Thus, the present system very accurately determines the angular position of the reticle 12 and the associated slit 14 since there are $2^5$ more counts from the counter 24 than there are steps on the stepping motor so that $2^5$ interpolation points are automatically provided between each step of the motor 32.

The reset or zero reference means 36 provides an electrical pulse to the counter 26 to reset it to a predetermined starting count for each revolution of the rotor 42 and of the reticle 12. Th reference signal is provided by a radiation emitter 44, e.g., infrared radiation, which is mounted adjacent to the system. A detector 46 is also mounted with reference to the emitter so that a cutout or zero reference slit 48 in the reticle 12 located on the reticle at a larger radius than the outer end of the reticle slit 14 allows the radiation to pass from the emitter 44 to the detector 46 once each revolution so that the detector 46 is energized to produce a reference signal to the counter 26 to reset the counter to its predetermined starting count. As an example, the emitter 44 may include a gallium arsenide electro-luminescent diode which radiates a high intensity narrow band of infrared light at approximately 900 Angstroms. This is beyond the response frequencies of a photo-multiplier or detector tube and therefore will not cause noise or false star detection by the photo detector 16 if any radiation passes through the reticle slit 14. In addition, the detector 46 may be a silicone planar PIN photodiode which has a speed of response of less than one nanosecond and a low dark current which enables detection of very low light levels.

Thus, the counter 26 is reset to a predetermined count, e.g., zero, for each cycle or revolution of the reticle 12 and begins counting at the beginning of each succeeding revolution until it is again reset. In this way, the ratio of the instantaneous count of the counter 25 to the total count of the counter is equal to the ratio of the instantaneous angular position of the stepping motor rotor assembly 42 and of the reticle 12 to 360° so that a very accurate determination of the angular position of the slit 14 can be made whenever a star image is formed on the reticle plane and is detected by the photodetector 16.

Figure 4:
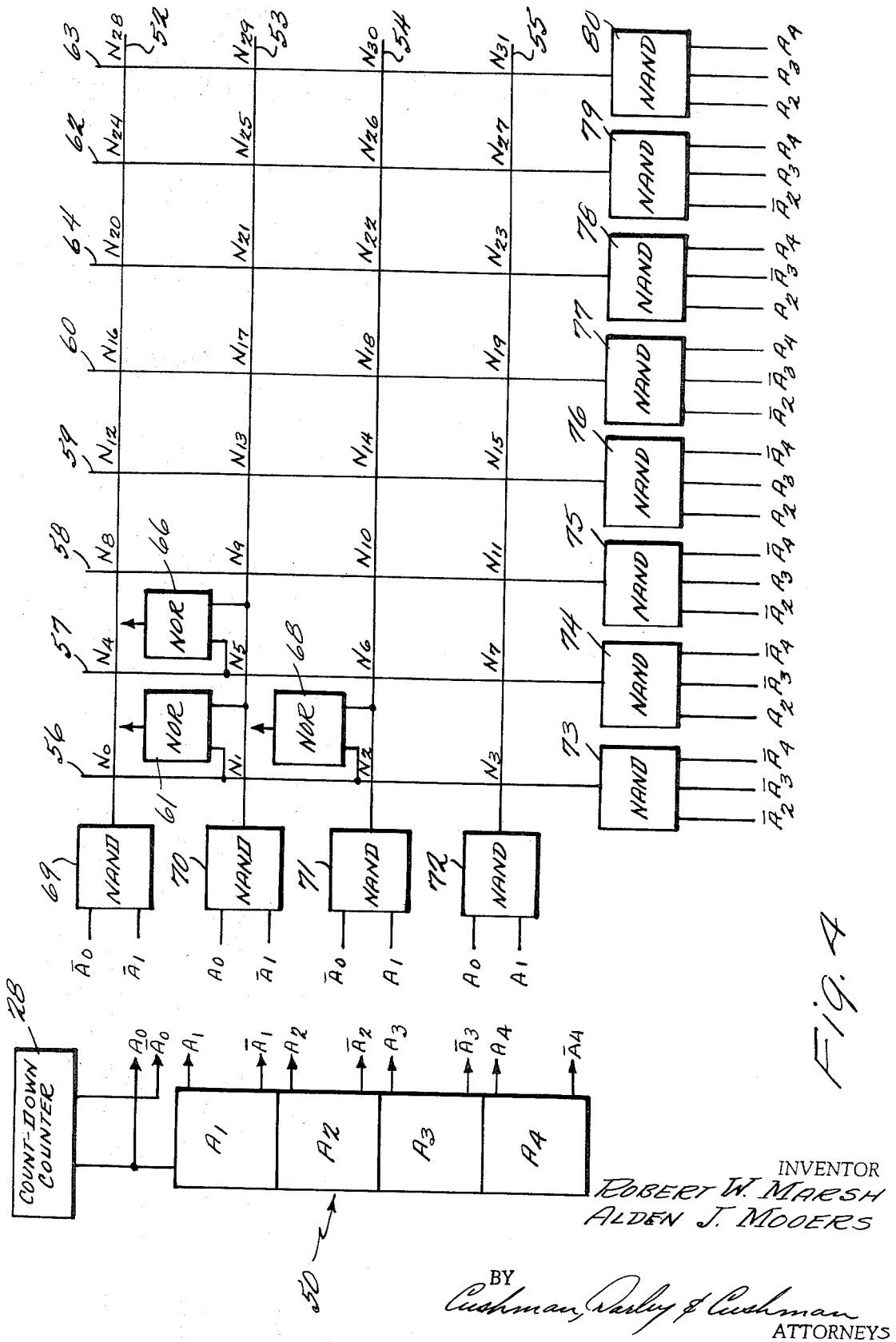
FIG. 4 is a block diagram view of the drive logic of the invention.

With reference now to FIG. 4 there is shown a more detailed block diagram of the drive logic or driving circuitry 30 which commutates the train of pulses from the count-down counter 28 to the proper sequence to drive the rotor assembly 42 in the desired direction. The example hereindescribed is with reference to a stator assembly containing 32 stator magnets; however, it should be clearly understood that this is merely representative and that the concept of this invention is not limited to any particular number of stator magnets within the stepping motor or to any particular configuration of stepping motor. The representative drive logic, as illustrated in FIG. 4, relates to a stator assembly having 32 stator magnets wherein pulses from the count-down counter 28 are fed into a four-bit binary counter 50. If the pulses from counter 28 are taken as the low order bit of the binary counter number, the bits $A_0 - A_4$ represent a thirty-two-state or modulo-32 number. This means that if all bits in the counter 50 including the clock pulse $A_0$ are initially zero, the counter output will advance on successive input pulses through 32 separate states or numbers (including the zero state) until all bits are one. The next pulse from counter 28 will then cycle the counter 50 to the zero state and the sequence will repeat. Both true and complement outputs are provided for the five-bit binary number representing the contents of the counter. This number must be translated or decoded into a signal that will appear on one of the 32 magnet drive transistor lines 52-63, which is accomplished by means of the dual-tree switching matrix illustrated in FIG. 4.

This matrix consists of four rows and eight columns, yielding 32 cross points or nodes labeled $N_0 - N_{31}$. A NOR gate is connected to the two lines at each node, as represented by the NOR gates 64, 66 and 68. Each NOR gate will supply a drive signal to its associated drive transistor (not shown) when its output is high. The output of a NOR gate will be high only if all inputs thereto are low so that both lines at the matrix cross point must be low in order to supply a drive signal. The rows and columns are drive by NAND gates 69-80, and in order for a line to be low, all inputs to the NAND gate must be high. The inputs to the NAND gates are true or complement data for each bit in the binary counter with no redundant terms so that for each five-bit binary number there will be one row NAND gate and one column NAND gate with inputs all high so as to cause the output therefrom to be low. The intersection of the row and column lines corresponding to those NAND gates with low outputs is the selected node for energizing the associated coil drive transistor (not shown). Thus, a sequence of 32 pulses, or one per each stator coil, is applied to the stator assembly 40 to advance the rotor assembly by one tooth, and a total of 32 times 256 or 8192 pulses are required to rotate the rotor assembly 42 through one revolution since the rotor has 256 teeth (not shown).

In the event that a stepping motor which is designed for low power consumption and which will not start by itself except at very slow speeds is utilized, a conventional starting circuit 27, as shown in FIG. 3, may be included between the count-down counter 24 and the countdown counter 28 so that a voltage at an initial frequency is provided and the motor may be started and gradually accelerated up to the desired running speed prior to the initiation of the operation of the position indicating system. This may be done with a well known variable frequency voltage controlled oscillator which should preferably have a dynamic range of at least 120:1 to be able to bring the speed of the motor up to 120 rpm. The starting circuit may also include a conventional reset and transfer circuit. The variable frequency oscillator may, for example, oscillate by using one operational amplifier as an integrator and a second operational amplifier as a level detector. As the integrator level changes because of the charging of a capacitor associated therewith, the level detector fires faster and faster since the time required to reach the level of the integrator is continually decreasing. The oscillator then gradually increases in frequency until it matches the frequency required for the desired RPM of the stepping motor, and at this time the transfer circuit switches the drive logic 30 from the variable starting oscillator to the count-down counter 24 which then continues driving the stepping motor at the constant selected speed.

It should be understood, of course, that the foregoing disclosure relates to only a preferred embodiment of the invention and that numerous modifications or alterations may be made therein without departing from the spirit and the scope of the invention as set forth in the appended claims.

What is claimed is:

1. A position indicating system for accurately providing information regarding the position of a movable member including a reticle having a radial slit therein, comprising:
   oscillator means for providing an electrical signal at a first frequency,
   count-down means connected to said oscillator means for receiving said first frequency signal and for producing a signal having a second frequency from said first frequency signal,
   an electrical motor connected to said reticle for movement in correspondence therewith,
   means connected to said motor and to said count-down means for driving said motor in accordance with said second frequency signal,
   counter means connected to said count-down means for providing an instantaneous count which is representative of the position of said reticle compared to a total count of said counter means representing rotation of said reticle through a full 360°,
   and means connecting said reticle to said counter means for resetting said counter means to a predetermined starting count for each cycle of movement of said reticle.

2. A system as in claim 1 wherein said driving means include a decoding matrix and wherein said matrix includes:
   a plurality of conductor rows and columns forming a plurality of nodes,
   a NOR gate connected at each of said nodes to the respective row and column conductor forming said node, a plurality of NAND gates respectively connected to each of said row conductor, a plurality of NAND gates respectively connected to each of said column conductor, and a binary counter operatively connected to said count-down means to receive signals acted upon by said count-down means and connected to said NAND gates to control the operation of said NAND gates.

3. A system as in claim 1 for determining the angular position of said member and wherein said counter means includes for producing an output such that the ratio of the instantaneous count of said counter means to the total count thereof is equal to the ratio of the instantaneous angular position of said electrical motor of said movable member to 360°.

4. A system as in claim 3 wherein said electrical motor is a stepping motor and wherein said counter means provide a plurality of interpolation counts between each step of said motor.

5. A system as in claim 1 further including:

a photodetector, a lens system mounted in orienting rotation with respect to said reticle to focus light passing through said lens system and through said radial slit onto said photodetector.

6. A system as in claim 5 further including:

means connected to said photodetector for amplifying the output therefrom to provide an amplified signal in response to the sensing of light by said photodetector, and a level detector coupled to said amplifying means for detecting the level of said amplified signal.

7. A system as in claim 6 further including:

means connected to said movable member and said counter means for resetting said counter means to predetermined starting count for each cycle of movement of said movable member.

8. A system as in claim 7 wherein said reticle includes a zero-reference slit and wherein said resetting means include:

an emitter mounted in orienting rotation with respect to said reticle to pass radiation through said zero-reference slit for each cycle of said reticle, a detector connected to said counting means and mounted for detecting said radiation as it passes through said zero-reference slit, and whereby said counting means is reset to said predetermined starting count whenever said radiation passes through said zero-reference slit and is detected by said detector.

9. A system as in claim 8 wherein said emitter and said detector include means for emitting and detecting infrared radiation.

10. A system as in claim 8 wherein said driving means include a decoding matrix and wherein said matrix includes:

a plurality of conductor rows and columns forming a plurality of nodes, a NOR gate connected at each of said nodes to the respective row and column conductors forming said node, a plurality of NAND gates respectively connected to each of said row conductors, a plurality of NAND gates respectively connected to each of said column conductors, and a binary counter operatively connected to said count-down means to receive signals acted upon by said count-down means and coupled to said NAND gates to control the operation of said NAND gates.

11. A system as in claim 1 wherein said count-down means includes a first count-down counter for receiving said first frequency signal and producing a signal having said second frequency, means for connecting said second frequency signal to said counter means, a second count-down counter for receiving said second frequency signal and producing a signal having a third frequency lower than said first and second frequencies and means connecting said third frequency signal to said driving means.

* * * * *